United States Patent
Besuchet et al.

(10) Patent No.: US 10,042,347 B2
(45) Date of Patent: Aug. 7, 2018

(54) STANDBY CONTROL FOR MACHINE TOOLS

(71) Applicant: Mikron Agie Charmilles SA, Nidau (CH)

(72) Inventors: Jean-Philippe Besuchet, Neuchatel (CH); Michael Monsch, Aarberg (CH); Micha Kuenzi, Nidau (CH)

(73) Assignee: MIKRON AGIE CHARMILLES SA, Nidau (CH)

( * ) Notice: Subject to any disclaimer, the term of this patent is extended or adjusted under 35 U.S.C. 154(b) by 318 days.

(21) Appl. No.: 14/930,709

(22) Filed: Nov. 3, 2015

(65) Prior Publication Data

US 2016/0124416 A1 May 5, 2016

(30) Foreign Application Priority Data

Nov. 3, 2014 (EP) .................................... 14191423

(51) Int. Cl.
*G05B 19/18* (2006.01)
*G05B 19/042* (2006.01)

(52) U.S. Cl.
CPC .......... *G05B 19/18* (2013.01); *G05B 19/042* (2013.01); *G05B 2219/25289* (2013.01); *G05B 2219/32021* (2013.01); *G05B 2219/34344* (2013.01); *Y02P 70/161* (2015.11); *Y02P 90/205* (2015.11)

(58) Field of Classification Search
CPC .................. G05B 19/042; G05B 19/18; G05B 2219/25289; G05B 2219/32021; G05B 2219/34344; Y02P 70/161; Y02P 90/205
See application file for complete search history.

(56) References Cited

U.S. PATENT DOCUMENTS

| | | | | |
|---|---|---|---|---|
| 2002/0195983 A1* | 12/2002 | Iwashita | .............. | G05B 19/408 318/567 |
| 2010/0026102 A1* | 2/2010 | Landgraf | ........... | G05B 19/0428 307/116 |
| 2012/0060662 A1* | 3/2012 | Hinshaw | .............. | B23D 45/048 83/364 |
| 2013/0190921 A1* | 7/2013 | Maekawa | .......... | B23Q 11/0007 700/177 |
| 2013/0302180 A1* | 11/2013 | Fujii | .................. | B23Q 11/0003 417/1 |
| 2015/0112503 A1* | 4/2015 | Matsumoto | ............ | G05B 15/02 700/299 |

FOREIGN PATENT DOCUMENTS

| | | |
|---|---|---|
| DE | 102011122515 A1 | 7/2003 |
| DE | 102013200595 A1 | 7/2014 |
| EP | 2149828 B1 | 2/2010 |
| EP | 2620819 A1 | 7/2013 |

* cited by examiner

Primary Examiner — Yuhui R Pan
(74) Attorney, Agent, or Firm — Leydig, Voit & Mayer, Ltd.

(57) ABSTRACT

A standby control for a machine tool. The standby control is operable for regulating the energy consumption of one or more energy-consuming components of the machine tool during nonoperation of the machine tool. The standby control includes a controller operable to individually activate or deactivate energy-consuming components according to a predeterminable input value in order that a temperature of at least one of the individual components or a temperature of the machine tool is influenced during nonoperation of the machine tool.

19 Claims, 1 Drawing Sheet

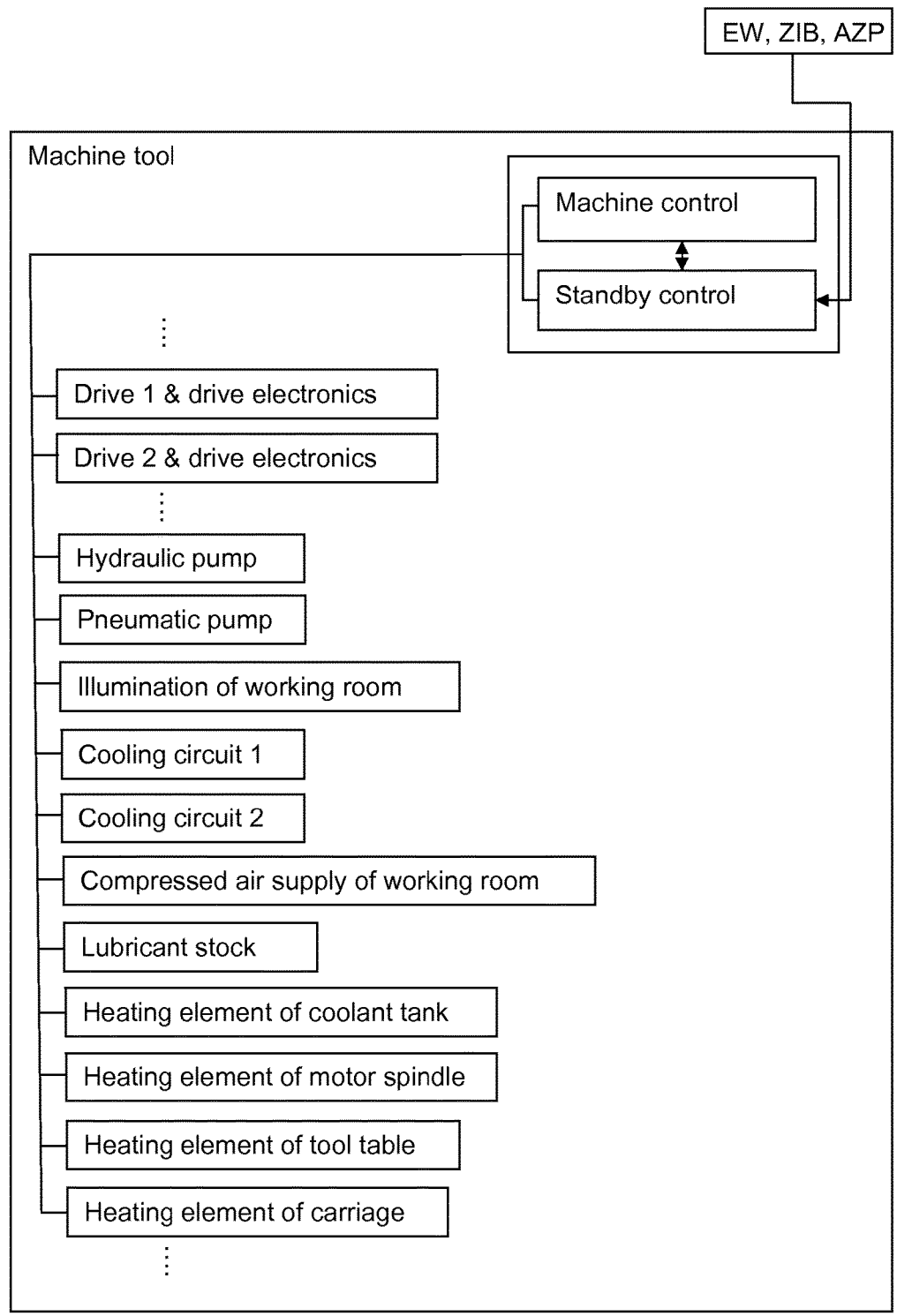

STANDBY CONTROL FOR MACHINE TOOLS

CROSS REFERENCE TO RELATED APPLICATIONS

This application claims benefit to European Patent Application No. EP 14/191423.4, filed Nov. 3, 2014, which is incorporated herein by reference.

FIELD

The present invention relates to a standby control for machine tools.

BACKGROUND

It is known to equip machine tools with standby controls which regulate the energy consumption of the machine tool. With the known standby modes, various component parts of a machine tool (drives, control, cooling, hydraulics, etc.) are put together into a sleep mode during nonoperation of the machine tool and often after a certain time, with the aim of saving energy.

Patent specification EP 2 149 828 B1 describes a multi-stage switch-off mechanism for machines in order to reduce the energy consumption. Accordingly, the machine has the states: "off", "sleep mode" (only a superordinate control is supplied with electricity), "standby" (a voltage is applied to the control for drives, lamps, etc, for example 24 V), "ready for production" (all production-relevant components, such as drives and auxiliary units, receive power, for example 380 V), "production" (the drives draw the energy necessary for the processing operation, and auxiliary units run continuously). If a machine or system according to patent specification EP 2 149 828 B1 is not being used, it first changes to "ready for production", then after a determinable period of time to "standby", and lastly after a further definable period of time automatically to "sleep mode", and finally it turns itself off fully. According to the aforementioned patent specification, the energy consumption of the machine can be reduced by about 30%. The disclosed device in this case also comprises the possibility of changing the machine from an energy-saving mode back into an operating mode in the case of a corresponding activation event (for example input by a user). In this case, a corresponding activation rule is applied. Whereas the teaching of this specification focuses on auto-mated deactivation of the component parts of the machine in order to achieve a low energy consumption, the reactivation of the machine and the influences thereof on the machine are not considered.

Although previous standby controls function well, they only allow the machine tool to be put into a maximum standby mode. On the one hand, this is very energy-efficient, but on the other hand it increases the warm-up time or impairs the processing accuracy of the machine tool at the beginning of the new start-up. The reason for this is that the heating, or thermal expansion, of the machine components has a great influence on the processing accuracy of the machine tool. Particularly with the current high precision and productivity requirements of modern machine tools (for example milling machines, CNC processing centres), rapid reaching of the optimal operating temperature—at which the required high processing accuracy is achieved—is very important. Current standby controls for machine tools take no account of this fact.

SUMMARY

In an embodiment, a standby control for a machine tool is provided. The standby control is operable for regulating the energy consumption of one or more energy-consuming components of the machine tool during nonoperation of the machine tool. The standby control includes a controller operable to individually activate or deactivate energy-consuming components according to a predeterminable input value in order that a temperature of at least one of the individual components or a temperature of the machine tool is influenced during nonoperation of the machine tool.

BRIEF DESCRIPTION OF THE DRAWINGS

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a schematic view of a machine tool having a standby control according to an embodiment of the invention.

DETAILED DESCRIPTION

An embodiment of the present invention provides an enhanced standby control for machine tools, which takes into account the restarting of the machine from a standby mode.

The standby control for machine tools, for regulating the energy consumption of one or more energy-consuming components of the machine tool during nonoperation of the machine tool may, in particular, be characterized in that with the aid of a predeterminable input value EW, preferably in the form of a graphical slide control which is represented on an input screen of the machine tool or in the form of discrete values, the energy-consuming components can be individually activated or deactivated, so that the temperature of these individual components and/or of the machine tool is influenced during nonoperation of the machine tool.

By virtue of the standby control according to an embodiment of the invention, it is now possible to operate a machine energy-efficiently as before and additionally to specify the processing accuracy immediately when the machine tool is started up from the standby mode. The essential advantage over previously known standby solutions: the machine tool is not reduced stepwise after an operational shutdown to a maximum standby mode, without taking into account the thermal machine state when restarting the machine tool. Instead, according to the invention individual energy-consuming components of the machine tool are deactivated, switched off, only to such an extent that the temperature of the component and/or ultimately of the machine tool is reduced only so much that directly during (re)starting of the machine tool from the standby mode the desired or predetermined specified assessing accuracy is, or can directly be called up. In this way, the productivity of the machine tool is noticeably increased: a warm-up time of the machine tool, during which products can be produced, or only waste can be produced, is avoided. This is in contrast to the known prior art, which only focus on a stepwise process of switching the machine off, or only on maximisation of the energy saving, and pay no attention to the restarting of the machine tool. According to the invention, the user can specify an input value EW, for example in the form of a visualised slide control on a touchscreeen of the machine tool controller. With this input value EW, the desired processing accuracy of the machine tool directly when restarting the machine tool from the standby mode is specified by the user of the standby control. That is to say, this desired assessing accuracy of the machine tool can be called off at any time, regardless of whether the machine tool has been in the standby mode, or not in operation, for only a few hours or even a few days.

The way of operating the machine tool according to an embodiment of the invention is not always optimally energy-saving. This applies in particular when the standby control of the machine tool is set for calling up the maximum assessing accuracy immediately and directly. With such a setting, some of the energy consuming components may not remain off or deactivated, over a prolonged period of time, but must be reactivated after some time by the standby control so that the temperature of these individual components and/or the temperature of the machine tool does not fall below a value which impairs the precision of the machine tool (i.e. its processing accuracy). Although such standby operation reduces the energy saving, it nevertheless allows a certainty energy saving compared with a machine tool in constant readiness for operation. Furthermore, such a setting of the standby control, in fiscal terms, leads to a higher saving in productivity since an unproductive warm-up phase is avoided. For example, for workpieces with high precision requirements it is not necessary to execute a time-consuming warm-up programme for a machine tool, etc.

The standby control according to an embodiment of the invention for machine tools has, in a preferred variant, various sensors which measure the temperature of the machine tool at one or more positions. The device may also measure the temperature of the individual energy-consuming components. Alternatively, the standby control conflicts with the aid of a stored mathematical module and the time elapsed since the last machine shutdown, the last tool processing (duration, load, for example by measuring the machine power), etc., optionally also combined with one or more representative temperature measurements on the machine tool (for example the temperature of the tool table or machine head) the current processing accuracy to be expected of the machine tool immediately when starting up. The standby control is therefore according to the invention not only able to deactivate individual energy-consuming components—which also generate waste heat, or in general heat—but is also capable of activating such components according to requirements, so that they have a direct or indirect thermal influence on the machine tool. The standby control may therefore activate and deactivate these components during the standby mode according to requirements, in order to achieve the desired thermal influence on the machine tool, or to maintain or re-achieve the desired processing accuracy.

The components may, as just mentioned, have a direct or indirect thermal influence on the machine tool. For example, the effect of operating a cooling circuit by means of a cooling pump during the standby mode is that a uniform temperature distribution in the part (for example in the motor spindle) is maintained, or that the waste heat generated by the pumping power of the pump keeps the part at a certain temperature. The intermittent activation of a fan inside the machine tool may, on the other hand, have an indirect thermal influence by inducing a uniform temperature distribution of the fanned machine parts.

The activation of a component (for example an electric motor) may also be understood as meaning that its drive electronics are supplied with the control voltage (for example 24 V) or that the operating voltage (for example 380 V) is applied to the component or its control, and the component would therefore actually be ready to perform. In both cases mentioned, the effects of applying the voltage to the control or to the drive electronics of the component is that waste heat is produced and this component—together with its environment—is heated to a certain extent, even if this component is not in operation (i.e. for example the electric motor is not turning).

The invention also contains, however, the possibility that only elements intended for the generation of heat (for example heating coils or heating elements) are fitted to the individual components or at particular positions of the machine tool, which are used for thermal stabilisation of determined machine regions (for example the motor spindle, bearing carriages, etc.). One very expedient and implementable embodiment of this possibility: the coolant tank contains heating elements which are driven by the standby control and ensure that the coolant is kept at a particular temperature or is to a particular temperature for a determined period of time. In this way, it is possible for example to prevent the coolant of a cooler holding 600 l in a machine tool cooling down to a room temperature of 18 degrees over a weekend, and when starting up the machine tool—which would be thermally regulated to 24 degrees—on Monday morning the workpiece and other machine parts being exposed to the coolant still at a temperature of 18 degrees therefore being locally cooled down (which can have a detrimental effect on the processing accuracy). Precisely by virtue of the standby control according to the invention, it is possible to ensure that the coolant in the cooling tank maintains a desired temperature or reaches this temperature again after a determinable period of time (for example Monday morning, 6 o'clock).

Activation of a component can therefore mean the generation or distribution of heat or waste heat for thermal stabilisation.

The standby control according to an embodiment of the invention can also be capable of not only activating these components, but at a given time also deactivating them, otherwise particular machine components or regions would possibly be heated excessively. For the purpose of desired thermal stabilisation of the machine tool, therefore, the standby control regulates the activation as well as the deactivation of these components.

The invention furthermore offers further functionalities and variants. For example, by means of at least one timer function provision may be made for the standby control to specify the planned instant for starting up the machine tool (for example time of day). In this way, the machine can be maximally run down temporarily—for example overnight or at the weekend—the standby control then reactivating the components of the machine tool promptly so that, at the established time, the machine tool and its components have a temperature or state which corresponds to the desired processing accuracy of the machine and can correspondingly be used immediately. Further functionalities and advantageous configurations of the invention may be found in the dependent claims or are explained in more detail below.

The standby control according to an embodiment of the invention for machine tools is used to regulate the energy consumption of individual energy-consuming components.

To this end, a predeterminable input value EW is specified for the standby control. This may be done on a user interface or control panel of the machine tool, and EW may for example have the form of a graphical slide control. On the basis of this predetermined input value EW, the standby control regulates the energy-consuming components individually by activating or deactivating them—during the standby mode or nonoperation of the machine. In this way, the temperature of the individual components and/or of the machine tool is regulated during nonoperation of the machine tool. Because the thermal state of the machine tool, or of particular machine tool regions, is regulated by the activation and deactivation of particular components, it is possible to determine and ensure the desired processing accuracy—determined by EW—when starting up.

For example, at least one of the following components may be activated or deactivated by the standby control during nonoperation of the machine tool or in standby mode, for the purpose according to the invention:
  drives or drive electronics of the workpiece table
  drives or drive electronics of the tool head
  hydraulics, hydraulic pump or drive electronics thereof
  pneumatics, pneumatic pump or drive electronics thereof
  illuminations in the working room of the machine tool
  cooling circuit or drive electronics thereof for motor spindle in the tool head or further drives in the machine tool
  cooling circuit or drive electronics thereof for control module
  central lubricant pump or drive electronics thereof
  spindle lubricant pump or drive electronics thereof or air supply thereof
  suction for dust, swarf or oil mist in the working room of the machine tool
  device for swarf management
  lubricating devices
  compressed air supply
  heating element in a machine tool component, preferably in the coolant tank of the coolant for thermally regulating machine tool components, in the coolant tank of the coolant for thermally regulating the working fluids, on the tool table, on carriages of the tool table, in the tool head or in a drive, particularly in the motor spindle of the tool head.

By virtue of the input value EW provided, according to an embodiment of the invention, to the standby control, the desired processing accuracy of the machine can respectively be called up immediately. That is to say, the temperature of the machine or of the machine tool regions essential for the processing accuracy is kept at a determined value (corresponding to EW), so that the thermal expansion or shrinkage of machine after a production for machine shutdown does not impair the processing accuracy of the machine tool beyond the predetermined input value EW.

That the processing accuracy of the machine tool, specified by means of the value EW, can respectively be called up immediately means that this processing accuracy is never fallen below during the standby mode, or nonoperation of the machine tool. The machine tool can therefore be returned to operation at any time, the duration of the nonoperation being irrelevant (i.e. whether it is only 5 minutes, 2 hours or 2 days).

In one conceivable embodiment of the standby control, a plurality of discrete values can be specified for the input value EW. For example, provision may be made that EW can have three different values. One value—for example referred to as accurate—may stand for maintaining a high processing accuracy, a second value—for example referred to as normal—may stand for maintaining a medium processing accuracy, and a third value—for example referred to as eco—may stand for maintaining a low processing accuracy, or maintaining no processing accuracy. It is also conceivable that EW can only have two different values, for example accurate and eco or accurate and normal.

If the input value EW is set to the first value "accurate", then during nonoperation of the machine, the machine tool activates or deactivates individual components in such a way that, when the machine tool is started up, it can already process workpieces with the processing accuracy which corresponds to the normal operating temperature (i.e. high accuracy).

If the input value EW is set to the second value "normal", then during nonoperation of the machine tool the standby control activates or deactivates individual components in such a way that, at any time when the machine tool is started up, it can process workpieces in a predeterminable tolerance range relating to the processing accuracy, but which does not correspond to the processing accuracy as achieved at the normal operating temperature.

If the input value EW is set to the third value "eco", then during nonoperation of the machine tool the standby control does not activate or deactivate individual components, or does so only restrictively, so that when the machine tool is started up it processes workpieces with a processing accuracy which lies outside a predeterminable tolerance range. At this third level, it is conceivable for the standby control not to activate the components at all—i.e. maximum energy saving—or to activate or keep thermally regulated only those which would entail a very long warm-up phase (for example hours) (for example only the coolant is kept at a temperature determined by means of a heating element, etc.).

In a preferred variant the standby control according to the invention additionally has a timer function, so that the desired processing accuracy specified by means of the input value EW is only called up at a predeterminable future time. It is therefore possible for the machine tool to be run down maximally—in terms of energy—for example overnight, but the standby control reactivates individual components of the machine tool at an appropriate time before the entered time so that, at the entered time, for example 6 o'clock the next morning, the machine tool is again so "warm" that the machine tool can be put in operation at the entered time with the desired processing accuracy according to the input value EW. To this end, the standby control may calculate the necessary warm-up days for various individual components of the machine tool, for the essential machine tool regions. Particularly preferably, to this end the standby control is also connected to temperature sensors which can measure the temperature at particular region or components of the machine tool. In this way, the standby control can regulate even better the thermal state of the machine tool and therefore the required processing accuracy.

The use of temperature sensors is advantageous in particular during conventional operation of the standby control: since the control according to the invention then simply has to maintain the temperature of individual components, or the machine tool, for the specified processing accuracy, by virtue of the temperature sensors these components can be deactivated again as soon as the measured temperature has reached a desired value. If the measured temperature of the component falls below a threshold value (for example 1 to 3 degrees below the desired value), then the standby control reactivates this component, etc. Regulation with temperature sensors is therefore more accurate and more efficient than, for example pure time control which activates the individual components for a calculated period of time and subsequently deactivates them again.

By means of the time control or the timer function, of the standby control, as mentioned time ZIB of the planned start-up of the machine tool can be specified. Preferably, this is done by input on the user interface of the machine tool, Particularly preferably via a keypad or a touchscreen. The time control can therefore activate individual energy-consuming components (and optionally also deactivate them again) before start-up, so that at the time ZIB of the planned start-up the temperature of the individual components and/or of the machine tool or of the distance reached, corresponds to the desired processing accuracy—according to the input value EW—of the machine tool.

According to another embodiment of the invention, it is likewise for the standby control additionally to comprise a warm-up programme for the activation of individual components of the machine tool. For example, the standby control can set particular moving parts of the machine tool in motion. For example, the tool table or the machine head could be controlled, predetermined movements could be carried out, or the motor spindle in the machine head is set in operation, or idling. A warm-up programme is suitable particularly in combination with the above-described timer function for warming up the machine tool at a particular time.

In a further variant of the invention, the planned switch-off time AZP may also be input in the standby control. When this switch-off time AZP is reached or passed, the machine tool and its energy-consuming components are deactivated to a minimum energy, or put into standby mode, after they have ceased operation. For example, the end of the last workshift (for example 20 hours) may be input at the switch-off time AZP. The machine tool, for example a fully automatic CNC machine, then processes a clamp workpiece to the end (for example until 21:30 hours) and then deactivates itself, or enters the desired standby mode. This variant with a planned switch-off time AZP may also be combined very well with the timer function described above.

Provision may also made for the machine to be run down by means of manual input by the operating personnel (for example pressing a button) into a standby mode in which the individual energy-consuming components are deactivated. This may be done essentially immediately when the button is pressed, the processing operation being interrupted and the machine tool coming to a stop, or doing so as soon as the clamp workpiece has been processed to the end.

Furthermore, provision may be made that the machine tool leaves the standby mode and activates the individual energy-consuming components as soon as manual activation is carried out. Such manual activation may take place by pressing a button on the machine for its user interface, or for example by unlocking the working room doors.

In another preferred embodiment, the standby control or the machine control has its own display, preferably on the monitor or touchscreen of the machine tool, on which with the aid of the current—for example measured—temperature of the individual components of the current processing accuracy of the machine tool is indicated, or visualised. Preferably, the displayed value of the current processing accuracy is linked with the adjusted input value EW of the desired processing accuracy. For example, the display for the visualisation of the current processing accuracy of the machine tool may have two discrete values, the first value indicating that the machine tool achieves the desired processing accuracy according to the input value EW, and the second value indicating that the machine tool does not achieve the desired processing accuracy according to the input value EW. Particularly preferably, these two values are visualised in the display as a lamp which can have a green or red colour. If the displayed value is green, this means that the machine tool can immediately be operated with the processing accuracy specified by the input value EW. If the display is not red, this seems that the machine tool does not (yet) reach the required processing accuracy. The machine operator must therefore continue to wait before starting up the machine tool.

The standby control according to the invention may be used on any machine tools, in particular on milling or turning machines, or it may be implemented and used as an additional functionality in known machine tool controls.

FIG. 1 shows a schematic view of a machine tool having a standby control according to the invention. As represented by way of example in the FIGURE, the standby control is a component part of the superordinate control system of the machine tool. It is also linked to the usual machine control. As the illustration shows, the standby control may be connected to numerous or individual energy-consuming components of the machine tool. The energy-consuming components are preferably elements/modules whose temperature or activity—for example in the case of a fan—noticeably to substantially influences the processing accuracy of the machine tool. The standby control according to the invention activates or deactivates the represented components individually according to requirements. In this way, it can influence the thermal state of the machine tool, or of the essential machine tool regions, during nonoperation of the machine tool (or when the standby mode is active) and ensure that the desired processing accuracy—predeterminable by means of the input value EW—of the machine tool can be called up directly at any time or—when the timer function is present—at a certain time.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A standby control for a machine tool, the standby control operable for regulating the energy consumption of one or more energy-consuming components of the machine tool during nonoperation of the machine tool, the standby control comprising:
a controller operable to individually activate and deactivate the one or more energy-consuming components according to a predeterminable input value in order to influence a temperature of at least one of the energy-consuming components or a temperature of the machine tool during nonoperation of the machine tool,
wherein the predeterminable input value can have a first value and a second value,
wherein when the first value is specified, during nonoperation of the machine tool the standby control activates or deactivates the one or more energy-consuming components in such a way that, when the machine tool is started up, it can process workpieces with a processing accuracy as at a normal operating temperature, and
wherein when the second value is specified, during nonoperation of the machine tool the standby control activates or deactivates the one or more energy-consuming components in such a way that, when the machine tool is started up, it can process workpieces with a processing accuracy which deviates from a normal processing accuracy within a predeterminable tolerance range.

2. The standby control for machine tools according to claim 1, wherein the energy-consuming components include one or more of:
drives or drive electronics of a workpiece table,
drives or drive electronics of a tool head,
hydraulics, a hydraulic pump, or drive electronics thereof,
pneumatics, a pneumatic pump, or drive electronics thereof,
illuminations in a working room of the machine tool,
a cooling circuit for a motor spindle in a tool head or drive electronics thereof or further drives in the machine tool,
a cooling circuit for a control module or drive electronics thereof,
a central lubricant pump or drive electronics thereof,
a spindle lubricant pump or drive electronics thereof or an air supply thereof,
a suction for dust, swarf or oil mist in the working room of the machine tool,
a device for swarf management,
lubricating devices,
a compressed air supply, and
a heating element in a machine tool component, in a coolant tank of a coolant for thermally regulating working fluids, on the tool table, on carriages of the tool table, in the tool head, in a drive, or in the motor spindle of the tool head.

3. The standby control for machine tools according to claim 1, wherein the predeterminable input value corresponds to a desired processing accuracy of the machine tool when starting up the machine tool.

4. The standby control for machine tools according to claim 1, wherein the predeterminable input value can have a third value,
wherein when the third value is specified, during nonoperation of the machine tool the standby control activates or deactivates the one or more energy-consuming components in such a way that, when the machine tool is started up, it can process workpieces with a processing accuracy which lies outside the predeterminable tolerance range of the normal processing accuracy.

5. The standby control for machine tools according to claim 1, further comprising:
a warm-up program for activation of individual components of the machine tool.

6. The standby control for machine tools according to claim 1, further comprising:
a time control with which a time of planned start-up of the machine tool can be specified, the time control configured to individually activate or deactivate the energy-consuming components before the planned start-up, so that at the time of planned start-up, at least one of a temperature of the energy-consuming components or of the machine tool corresponds to a processing accuracy of the machine tool desired according to a predetermined input value.

7. The standby control for machine tools according to claim 6, wherein the time control comprises a planned switch-off time of the machine tool and, when the switch-off time is reached or passed, the machine tool and its energy-consuming components are deactivated into a predetermined energy-saving mode according to the input value after they have ceased operation.

8. The standby control for machine tools according to claim 1, further comprising:
a user interface configured to receive manual input by an operating personnel to reduce the machine tool to a standby mode in which at least a portion of the energy-consuming components are deactivated in a staggered fashion as soon as the machine tool is at rest.

9. The standby control for machine tools according to claim 1, wherein in the event of an operational interruption of the machine tool due to an error message or defect, the machine tool does not enter a standby mode and the energy-consuming components remain activated.

10. The standby control for machine tools according to claim 1, further comprising:
a user interface configured to receive manual activation input causing the machine tool to leave a standby mode,
wherein the energy-consuming components are activated as soon as manual activation input is received.

11. The standby control for machine tools according to claim 1, further comprising:
a display configured to display a current processing accuracy of the machine tool indicated with aid of at least one of a temperature of the energy-consuming components or an ambient temperature of the machine tool.

12. The standby control for machine tools according to claim 11, wherein the display has a first discrete value and a second discrete value,
wherein the first discrete value indicates that the machine tool achieves the desired processing accuracy according to the input value, and
wherein the second discrete value indicates that the machine tool does not achieve the desired processing accuracy according to the input value.

13. The standby control for machine tools according to claim 1, further comprising:
an input screen configured to represent a graphical slide control,
wherein the graphical slide control provides the predeterminable input value.

14. The standby control for machine tools according to claim 6, further comprising:

a user interface configured to receive the time of planned start-up.

15. The standby control for machine tools according to claim 14, wherein the user interface includes at least one of a keypad or a touchscreen.

16. The standby control for machine tools according to claim 11, wherein the displayed value of the current processing accuracy is linked with an adjusted input value of a desired processing accuracy.

17. The standby control for machine tools according to claim 12, wherein the display is a lamp configured to have at least one of a green color or a red color.

18. A machine tool comprising:
a standby control operable for regulating energy consumption of one or more energy-consuming components of the machine tool during nonoperation of the machine tool, the standby control including:
a controller operable to individually activate and deactivate the one or more energy-consuming components according to a predeterminable input value in order to influence a temperature of at least one of the individual components or a temperature of the machine tool during nonoperation of the machine tool,
wherein the predeterminable input value can have a first value and a second value,
wherein when the first value is specified, during nonoperation of the machine tool the standby control activates or deactivates the one or more energy-consuming components in such a way that, when the machine tool is started up, it can process workpieces with a processing accuracy as at a normal operating temperature, and
wherein when the second value is specified, during nonoperation of the machine tool the standby control activates or deactivates the one or more energy-consuming components in such a way that, when the machine tool is started up, it can process workpieces with a processing accuracy which deviates from a normal processing accuracy within a predeterminable tolerance range.

19. The machine tool of claim 18, wherein the machine tool comprises a milling machine, a spark erosion machine, or a laser processing machine.

* * * * *